United States Patent [19]
Halter

[11] Patent Number: 4,784,595
[45] Date of Patent: Nov. 15, 1988

[54] APPARATUS FOR EXTRUSION OF A THERMOPLASTIC MATERIAL

[75] Inventor: Hartmut Halter, Troisdorf-Eschmar, Fed. Rep. of Germany

[73] Assignee: Reifenhauser GmbH & Co. Maschinenfabrik, Troisdorf, Fed. Rep. of Germany

[21] Appl. No.: 91,818

[22] Filed: Sep. 1, 1987

[30] Foreign Application Priority Data

Sep. 3, 1986 [DE] Fed. Rep. of Germany ....... 3629995

[51] Int. Cl.⁴ .............................................. B29C 47/92
[52] U.S. Cl. .................................. 425/144; 264/40.6; 264/40.7; 425/147; 425/376.1; 425/378.1
[58] Field of Search ........... 425/144, 147, 143, 376 R, 425/378 R; 264/40.6, 40.7

[56] References Cited

U.S. PATENT DOCUMENTS

| | | | |
|---|---|---|---|
| 3,721,512 | 3/1973 | Ma et al. | 264/40.6 X |
| 3,924,840 | 12/1975 | Nelson, Jr. | 264/40.6 X |
| 4,088,430 | 5/1978 | Giles | 425/144 |
| 4,168,290 | 9/1979 | Giles | 264/40.6 |
| 4,171,193 | 10/1979 | Rahlfs | 425/144 X |
| 4,183,448 | 1/1980 | Nash | 425/144 X |
| 4,244,897 | 1/1981 | Moon | 425/144 X |
| 4,309,114 | 1/1982 | Klein et al. | 264/40.6 X |
| 4,311,446 | 1/1982 | Hold et al. | 425/144 |
| 4,425,289 | 1/1984 | Lee et al. | 264/40.6 X |
| 4,550,002 | 10/1985 | Uhland et al. | 264/40.6 X |

FOREIGN PATENT DOCUMENTS 3343777  7/1984  Fed. Rep. of Germany .

OTHER PUBLICATIONS

H. G. Wiegand, "Prozessautomatisierung Beim Extrudieren und Spritzgiessen von Kunststoffen" Carl Hanser Verlag Munchen Wien 1979, RI 10619, pp. 35–38.

G. Menges & R. Hegele, "Temperatur-und Energiemessungen in der Einzugszone Eines Einschnecken-Extruders, PV (23) 1972 5, pp. 332–338.

M. Seeger, Nurnberg "Kaskadenregelung an Kunststoffextrudern" PV (24) 1971 (1), pp. 598–600.

"Kaskadenregelung an Kunststoffextrudern" PV (24) 1973 (1), 2 pages.

Primary Examiner—Richard L. Chiesa
Attorney, Agent, or Firm—Herbert Dubno

[57] ABSTRACT

The apparatus for extrusion of a thermoplastic material comprises an extruder with an extruder screw and an extruder housing with a feed opening, a feed device, a drive with a variable speed motor and a regulating device cascade for the mass temperature. The regulating device cascade has a plurality of tempering zones, at least one mass temperature detector and at least one tempering device. One tempering zone connected directly to the feed opening is part of the regulating device cascade and the temperature in the one tempering zone is corrected by a set value during a mass temperature variation. To provide a temperature regulation range which does not experience disturbing decreases, the tempering zone at the feed opening has only a cooling device and has a grooved sleeve. The feed device is a gravity feed device and belongs to an additional regulating loop which controls the rotational speed of a variable speed motor. When an excessive value of the mass temperature and throughput occurs, the regulating loop to which the gravity feed device belongs causes the drive speed of the variable speed motor to be reduced; an insufficient value gives rise to an increased motor speed. The regulating device cascade and the additional regulating loop are connected by a logic unit, advantageously a computer, which compensates for variations.

2 Claims, 1 Drawing Sheet

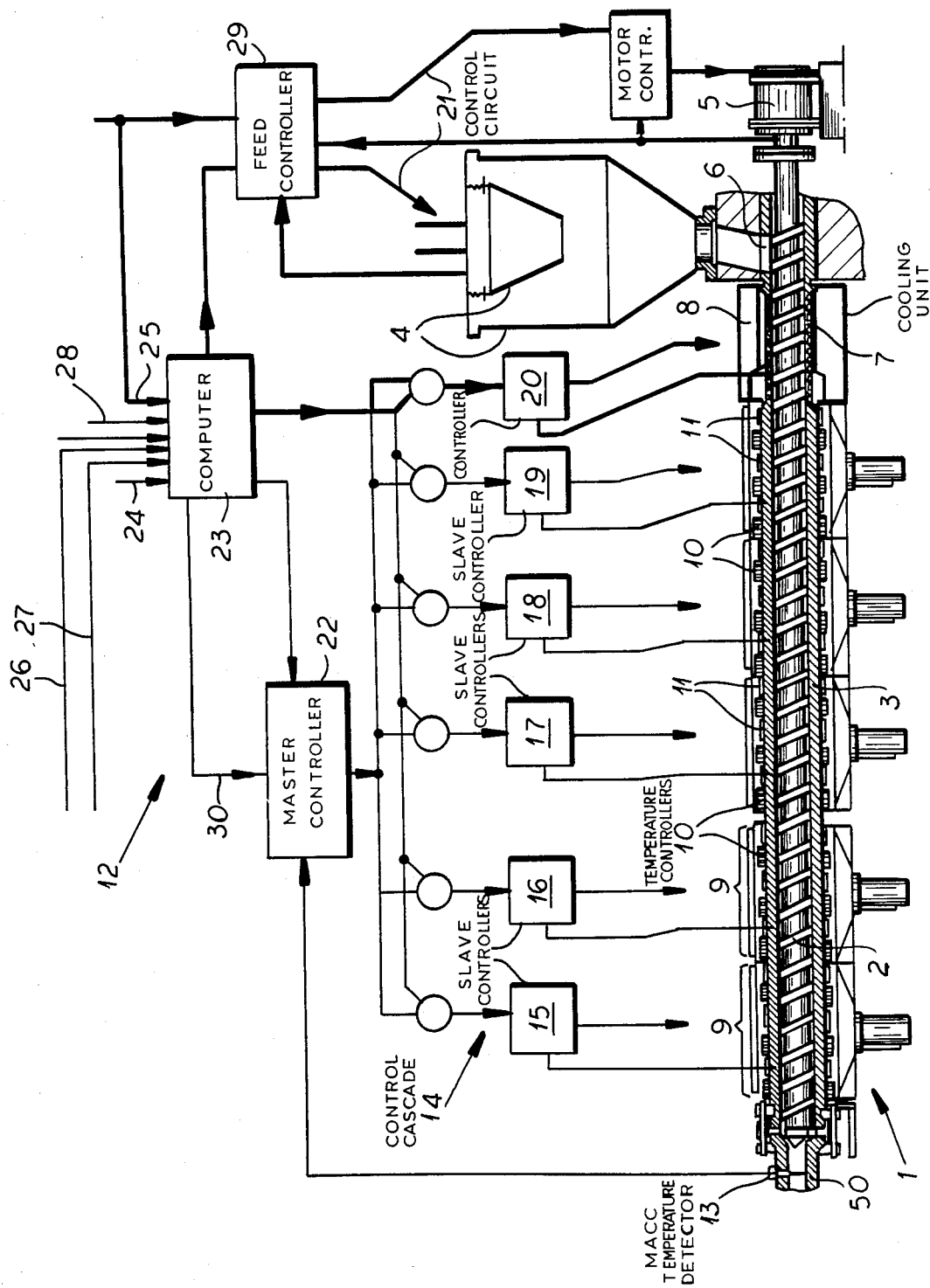

APPARATUS FOR EXTRUSION OF A THERMOPLASTIC MATERIAL

FIELD OF THE INVENTION

My invention relates to an apparatus for extrusion of a thermoplastic material.

BACKGROUND OF THE INVENTION

An apparatus for extrusion of a thermoplastic material can comprise an extruder with an extruder screw and an extruder housing with a feed opening, a feed device, an extrusion die, a drive for the extruder screw with a variable speed motor and a regulating or control cascade or array for the mass temperature.

The regulating cascade has a plurality of tempering zones, at least one mass temperature detector and at least one tempering temperature-control unit downstream of the feed opening and upstream of the extrusion die.

One tempering zone connected directly to the feed opening is part of the regulating cascade and the temperature in that one temperature control zone is corrected to a set-point value upon a mass temperature variation. Further, the drive speed of the variable speed motor is reduced in the event of an excessive throughput and vice versa. The mass temperature can be measured directly by a temperature detector or indirectly, e.g. by the viscosity.

A regulating device cascade in an apparatus for extrusion of thermoplastic material is known. By "regulating device cascade" I mean a series or group of regulating devices which control the mass temperature using the wall temperature of the extruder housing as an auxiliary value with a corresponding auxiliary regulating loop.

In the temperature control zones a heating or cooling occurs according to the design of the controlling assembly. Usually five or six temperature control zones are provided along the length of the extruder housing.

In the known apparatus on which my invention is based (H. G. Wiegand, "Prozeßautomatisierung beim Extrudieren and Spritzgießen von Kunststoffen", Munich/Vienna, 1979, Page 37, 38; the journal "Plastvorarbeiter(PV)", Vol. 24, 1973, page 598 to 602) the temperature control portion of the extruder connected to the feed opening comprises a heating device and is provided with a smooth passage in which the extruder screw operates.

The regulating cascade affords a rapid control of the variations in the individual temperature control zones by the auxiliary control loop, and in regard to the mass temperature, a high control reliability.

As has been shown in practice independently of the variation size and the operating level of the extruder dependable control of the mass temperature is guaranteed over a regulating range of $+/-50°$ C.

The regulating cascade is subject to external control if, because of prior events and resulting measured values, the difference between the mass temperature actual value and the preset set value becomes larger. ("Plastverarbeiter(PV)", l.c., Page 600, right Column, lines 7 to 14). Among other things in this known apparatus the feed of material delivered to this region which connects to the feed opening, the so-called entrance region, is in need of improvement.

To improve the feed of material delivered to the entrance of an extruder it is known to provide a cooled grooved sleeve in the region of the entrance or feed opening. ("Plastverarbeiter (PV)", Vol. 23, 1972, Page 332, FIG. 1). A grooved sleeve at the entrance, of course, stabilizes the feed of the delivered material. However, the existing regulation range is reduced to $+/-10°$ C. which impairs the entire availability of the apparatus in regard to the preparation of various thermoplastic materials.

OBJECTS OF THE INVENTION

It is an object of my invention to provide an improved apparatus for extrusion of a thermoplastic material which will obviate these drawbacks.

It is also an object of my invention to provide an apparatus for extrusion of a thermoplastic material with improved feed of the material so that the regulating range available for control of the mass temperature is comparatively wide.

It is another object of my invention to provide an improved extruder with reliable feed of the delivered material to the entrance of the extruder so that the accessible regulating range for control of the mass temperature is $+/-50°$ C. and the apparatus is suitable for extrusion of a variety of materials.

SUMMARY OF THE INVENTION

These objects and others which will become more readily apparent hereinafter are attained in accordance with my invention in an apparatus for extrusion of a thermoplastic material comprising an extruder with an extruder screw and an extruder housing with a feed opening, a feed device, a drive with a variable-speed motor and a regulating cascade for the mass temperature. The regulating cascade has a plurality of temperature control zones, at least one mass temperature detector and at least one temperature control device downstream of the feed opening. One temperature control zone connected directly to the feed opening forms part of the regulating cascade and the temperature in the one temperature control zone is corrected by a set-point value during a mass temperature variation. Further the drive speed of the variable-speed motor is reduced and reversed when the throughput is excessive and is increased at reduced throughput.

According to my invention the one temperature control zone connected with the feed opening is constructed and arranged to be only a cooling device and has a grooved sleeve in which the worm rotates.

The feed device is a gravity feed device and is connected to an additional regulating loop which controls the rotational speed of the variable-speed motor so that with an excessive value of mass temperature and throughput the regulating loop to which the gravity feed device belongs reduces (and vice versa) the drive speed of the variable-speed motor.

The regulating cascade and the additional regulating loop are connected to a logic unit or computer which compensates for variations. Some of these features are present in German Open Application 33 43 777 detailing an extruder with a plurality of temperature control zones with associated controllers, without, however, a regulating cascade. The drive speed of the variable-speed motor which acts on the extruder screw is effected by the controller and of course by delay elements. That system is provided for another purpose, namely to eliminate start up problems.

The advantages of the invention derive from the controlling connections between the regulating cascade and the additional control loop to which the gravity feed device belongs and which acts on the variable-speed motor, and in the functional blending of these controlling connections with the grooved sleeve which is provided in conjunction with a cooling device at the entrance or feed opening and in its integration in the regulating cascade.

If the mass temperature is too high in the apparatus according to my invention the described features cause first a reduction of the temperature of the cooling device so that a very intense cooling results in the vicinity of the grooved sleeve.

As a result the specific throughput per rotation and thus the total throughput climbs and can go so far that the mass temperature in the vicinity of the mass temperature detector sinks below the set-point value.

Then the control loop to which the gravity feed device belongs can be activated and controls the rotation speed of the variable-speed motor.

The gravity feed device is set so that when the throughput is too high the rotation speed is reduced. The consequence would be that the mass temperature is further lowered in the vicinity of the mass temperature detector. To prevent this, the regulating cascade and the control loop to which the variable-speed motor and the feed device belong are connected by a logic device, advantageously a computer, so that regulatory variations can be avoided. If the mass temperature of the mass temperature detector is lowered, the described assembly functions with reversed sign (i.e. in reverse).

As a result the following advantages are attained: on the one hand the apparatus according to my invention improves the feed of the material delivered to the entrance or feed opening and moreover guarantees that on the other hand the controlling range for the mass temperature does not experience a disturbing reduction and a specified range of $+/-50°$ C. is attained.

BRIEF DESCRIPTION OF THE DRAWINGS

The above and other objects, features and advantages of my invention will become more readily apparent from the following description, reference being made to the accompanying highly diagrammatic drawing in which the sole FIGURE is a schematic diagram or flow chart of an apparatus for extrusion of a thermoplastic material according to my invention showing in a cross section an extruder of that apparatus.

SPECIFIC DESCRIPTION

The apparatus shown in the drawing is designed for extrusion of a thermoplastic material.

This apparatus basically comprises an extruder 1 with an extruder screw 2 and an extruder housing 3, a feed device 4, an extrusion die 50 connected at the left end which is only partly shown and a drive for the extruder screw 2 with a variable-speed motor 5.

The extruder housing 3 is provided with a grooved sleeve 7 connected at the feed opening 6 which is part of the feed device 4.

The extruder housing 3 is equipped with a cooling unit 8 in the vicinity of the grooved sleeve 7. The extruder housing 3 has a plurality of temperature control zones 9 distributed along its length and these are equipped with temperature control devices 10, 11, e.g. electric heaters and cooling coils.

A control unit 12 for the mass throughput and the mass temperature is essential for the operation of the apparatus. This control unit 12 has a direct or indirect mass temperature detector 13 in the vicinity of the extrusion die.

The temperature control devices 10,11 of the control unit 12 form part of a regulating cascade or array 14. The regulating cascade operates with and comprises the series of regulators or controllers 15, 16, 17, 18, 19 and 20.

The cooling device 8 is also part of the regulating cascade 14.

When the mass temperature at the mass temperature detector 13 varies from the set-point value the temperature of the cooling device 8 is corrected.

The feed device 4 is a gravity feeder. It is associated with an additional control loop 21 which controls the drive speed by the variable-speed motor 5 under the condition that o variation of the mass throughput from the set-point value predetermined for the feed device 4 the drive rotational speed is corrected.

The control device 22 with the regulating cascade 14 and the regulating loop 21 to which the variable-speed motor 5 and the feed device 4 belong are connected by a logic unit. The last mentioned feature should be clear from the drawing since the cooling unit 8 belonging to the regulating cascade 14 is located on the right in the drawing and has been drawn with thicker lines than the remaining components.

It is understood that the logic unit comprises a computer 23 which is set according to the operating conditions.

The mass temperature set-point value or the viscosity set-point value is fed to this computer 23 when the mass temperature is measured indirectly and of course via input line 24. The mass throughput set-point value is delivered via input line 25. Usually the energy consumption of the drive is supplied via input line 26 and the energy consumption for the heating and/or cooling via input line 27.

Moreover the computer 2 must be fed information including the type of raw material used and the parameters regarding the plant design by input line 28. The energy consumption optimization is thus achievable.

The values delivered to the computer 23 are fed as regulating parameters to the regulating unit comprising control device 22 for the regulating cascade 14 and/or to the regulator 29 of the additional regulating loop 21 of which the gravity feed device 4 is a part. The mass temperature set-point value reaches the control device 22 over line or conductor 30.

I claim:

1. In an apparatus for extrusion of a thermoplastic material mass comprising an extruder with an extruder screw and an extruder housing with a feed opening, a feed device, a drive with a variable-speed motor, a regulating cascade for the mass temperature, said regulating cascade having a plurality of temperature control zones, at least one mass temperature detector and at least one temperature control device downstream of said feed opening, one of said temperature control zones connected directly to said feed opening belonging to said regulating cascade and the temperature in said one of said temperature control zones being corrected by a set-point value during a mass temperature variation and further the drive speed of said variable-speed motor being reduced when throughput is excessive and increased when throughput is reduced, the improvement wherein said one of said temperature control zones connected to said feed opening is constituted only as a cooling device and has a grooved sleeve in which said screw rotates, said feed device is a gravity feed device and is part of an additional regulating loop which controls the rotational speed of said variable-speed motor so that with an excessive value of said mass temperature and said throughput said regulating loop to which said gravity feed device belongs reduces said drive speed of said variable-speed motor and increases said drive speed of said variable speed motor with an insufficient value of said mass temperature and said throughput and said regulating cascade and said additional regulating loop are connected by a logic unit which compensates for variations.

2. An apparatus for extrusion of a thermoplastic material comprising:

an extruder with an extruder screw and an extruder housing with a feed opening;

a drive with a variable-speed motor for said extruder screw;

a gravity feed device for feeding said feed opening of said extruder which is part of an additional regulating loop which controls the rotational speed of said variable-speed motor;

a regulating cascade for the mass temperature in said extruder, said regulating cascade having a plurality of temperature control zones, at least one mass temperature detector and at least one temperature control device downstream of said feed opening, one of said temperature control zones connected directly to said feed opening belonging to said regulating cascade and the temperature in said one of said temperature control zones being corrected with a set-point value during a mass temperature variation and further the drive speed of said variable-speed motor being reduced when through put is excessive and increased when the throughput is reduced;

a grooved sleeve in said one of said temperature control zones connected to said feed opening which is connected to said gravity feed device and in which said screw rotates;

a cooling device in said one of said temperature control zones at said feed opening; and logic means connected to and controlling said regulating cascade and said additional regulating loop for servocontrol of said throughput and said mass temperature.

* * * * *